US009013507B2

(12) United States Patent
Plante et al.

(10) Patent No.: US 9,013,507 B2
(45) Date of Patent: Apr. 21, 2015

(54) PREVIEWING A GRAPHIC IN AN ENVIRONMENT

(75) Inventors: Jean-Frederic Plante, San Diego, CA (US); Eric G Wiesner, San Diego, CA (US); David Edmondson, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 343 days.

(21) Appl. No.: 13/040,599

(22) Filed: Mar. 4, 2011

(65) Prior Publication Data

US 2012/0223961 A1    Sep. 6, 2012

(51) Int. Cl.
| | |
|---|---|
| *G09G 5/00* | (2006.01) |
| *H04N 1/00* | (2006.01) |
| *G06F 3/147* | (2006.01) |
| *H04N 5/232* | (2006.01) |
| *H04N 5/272* | (2006.01) |

(52) U.S. Cl.
CPC ............ *H04N 1/00411* (2013.01); *G06F 3/147* (2013.01); *G09G 2340/12* (2013.01); *G09G 2354/00* (2013.01); *H04N 5/23216* (2013.01); *H04N 5/23293* (2013.01); *H04N 5/272* (2013.01); *H04N 2201/3245* (2013.01); *H04N 2201/3261* (2013.01); *H04N 1/0044* (2013.01); *H04N 1/00469* (2013.01)

(58) Field of Classification Search
USPC .................................................. 345/632, 633
See application file for complete search history.

(56) References Cited

U.S. PATENT DOCUMENTS

| | | | | |
|---|---|---|---|---|
| 5,524,195 | A * | 6/1996 | Clanton et al. ................. 725/61 |
| 6,331,858 | B2 * | 12/2001 | Fisher ........................... 345/582 |
| 6,524,107 | B1 * | 2/2003 | Brown ............................ 434/72 |
| 7,102,633 | B2 * | 9/2006 | Kaye et al. .................... 345/419 |
| 7,277,572 | B2 * | 10/2007 | MacInnes et al. ............ 382/154 |
| 7,457,730 | B2 * | 11/2008 | Degnan ............................ 703/1 |
| 7,523,411 | B2 * | 4/2009 | Carlin ........................... 715/782 |
| 7,830,417 | B2 * | 11/2010 | Liu et al. .................. 348/211.99 |
| 7,991,778 | B2 * | 8/2011 | Hull et al. ..................... 707/741 |
| 8,243,062 | B2 * | 8/2012 | Schultz et al. ................ 345/419 |
| 8,266,012 | B2 * | 9/2012 | Chung ......................... 705/26.5 |
| 8,830,251 | B2 * | 9/2014 | Jain et al. ...................... 345/589 |
| 2001/0034668 | A1 * | 10/2001 | Whitworth ...................... 705/27 |
| 2001/0055414 | A1 * | 12/2001 | Thieme ......................... 382/135 |
| 2002/0032546 | A1 * | 3/2002 | Imamura et al. ................. 703/1 |
| 2002/0069078 | A1 * | 6/2002 | Goldstein ........................ 705/1 |
| 2004/0012613 | A1 * | 1/2004 | Rast .............................. 345/632 |
| 2004/0161727 | A1 * | 8/2004 | Brodine ......................... 434/72 |
| 2005/0081161 | A1 * | 4/2005 | MacInnes et al. ............. 715/765 |
| 2006/0041848 | A1 * | 2/2006 | Lira .............................. 715/805 |
| 2006/0184884 | A1 * | 8/2006 | Chaturvedi .................. 715/751 |
| 2007/0143082 | A1 * | 6/2007 | Degnan ............................ 703/1 |

(Continued)

OTHER PUBLICATIONS

Hile et al., Postioning and Orientation in Indoor Environments Using Camera Phones, IEEE Computer Graphics and Applications, Nov. 16, 2007, pp. 1-13.*

(Continued)

*Primary Examiner* — M Good Johnson
(74) *Attorney, Agent, or Firm* — Hewlett-Packard Patent Department

(57) ABSTRACT

A method includes defining a surface within a first captured image of an environment. The defined surface is identified in a second captured image of the environment. A graphic is overlaid on the surface identified in the second captured image. The second captured image is caused to be displayed to preview the graphic in the environment.

21 Claims, 7 Drawing Sheets

(56) References Cited

U.S. PATENT DOCUMENTS

| | | | |
|---|---|---|---|
| 2009/0106671 A1* | 4/2009 | Olson et al. | 715/757 |
| 2010/0208033 A1 | 8/2010 | Edge et al. | |
| 2011/0037777 A1* | 2/2011 | Lindahl et al. | 345/619 |
| 2011/0052083 A1* | 3/2011 | Rekimoto | 382/218 |
| 2012/0050323 A1* | 3/2012 | Baron et al. | 345/632 |
| 2012/0113141 A1* | 5/2012 | Zimmerman et al. | 345/633 |
| 2012/0139912 A1* | 6/2012 | Sandige et al. | 345/419 |
| 2012/0183204 A1* | 7/2012 | Aarts et al. | 382/154 |

OTHER PUBLICATIONS

Jean-Frederick Plante, Iphone3GS—Paper published at www.rentacoder.com on Jun. 1, 2010 (1 page).

* cited by examiner

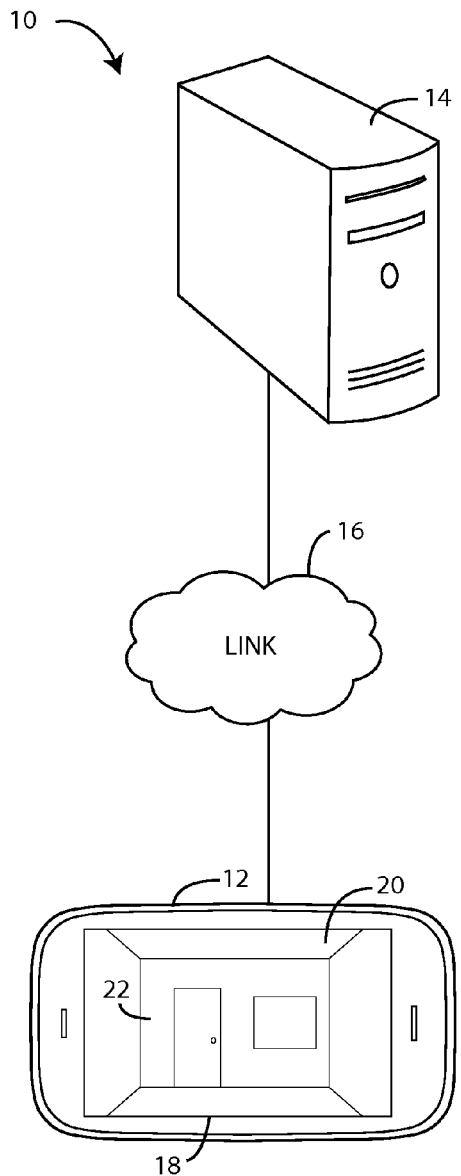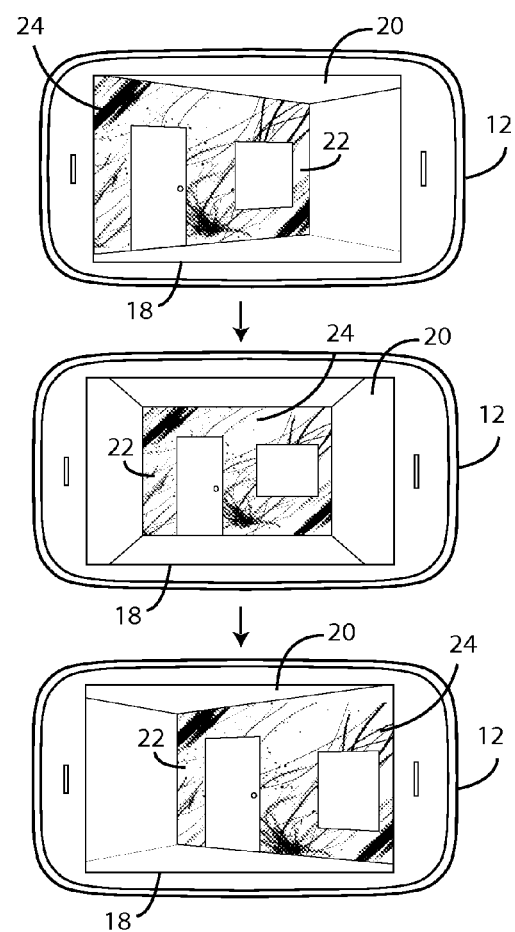
FIG. 1A
FIG. 1B

PREVIEWING A GRAPHIC IN AN ENVIRONMENT

BACKGROUND

Products such as wallpaper can be custom designed for a specific wall in a room. Often, one may fail to account for door or window placement on a wall and how those objects may interfere with the pattern of the wallpaper. Like most custom products, once ordered, manufactured, and shipped, custom wall-paper often cannot be reused if it is later determined that mistakes were made in the design or if it simply proves not to be aesthetically pleasing.

DRAWINGS

FIGS. 1A and 1B depict an exemplary environment in which various embodiments may be implemented.

DETAILED DESCRIPTION

Introduction

Figure 2:
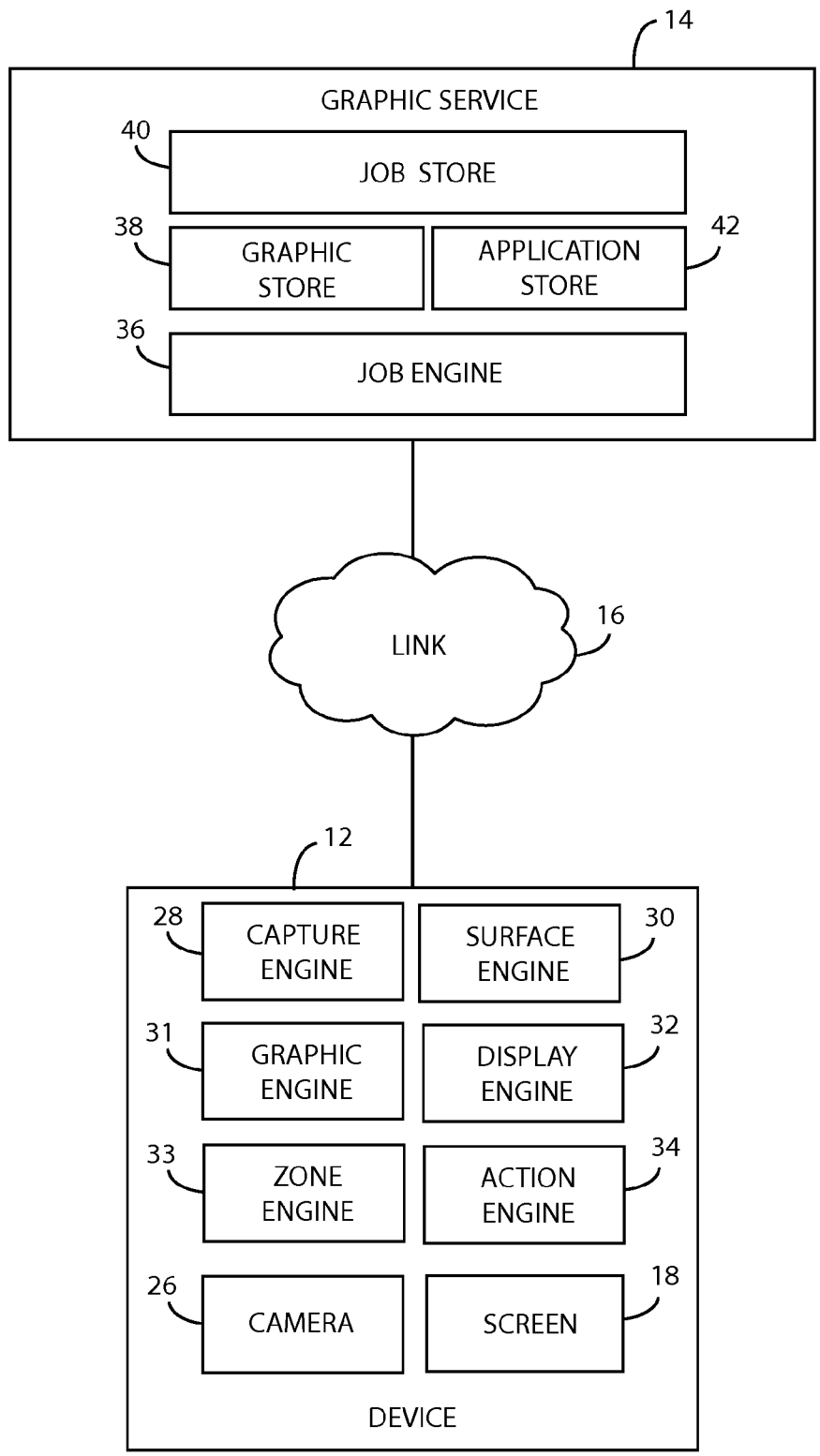
FIGS. 2-3 depict example and various physical and logical components for implementing various embodiments.

Various embodiments described below were developed in an effort to allow a customer to preview a graphic on a surface in an environment. The term graphic, as used herein, is used to mean a virtual representation of a physical object. A graphic may be a digital image of that object. Wall paper is just one example of such an object. The term environment is used to refer to a location that can be captured in an. The term surface, as used herein, is used to refer to any generally to an area of an image. That area may, but need not, represent an actual surface such as a wall or floor in the environment depicted in the image. In a particular example, that graphic to be previewed may be a representation of a wall paper design. A preview is accomplished by overlaying the graphic on a pre-defined surface within an image or a series of images that make up a video.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Environment:

FIG. 1A depicts an environment 10 in which various embodiments may be implemented. Environment 10 is shown to include device 12 and graphic service 14. While environment 10 is shown to include one device 12 and one graphic service 14, environment 10 may include any number of such components.

Device 10 represents generally any computing device capable of capturing images, modifying those images, and displaying the modified images for viewing by a user. Examples include, but are not limited to, smart phones and tablets. Graphic service 14 represents generally any network service configured to supply a graphic to device 12. Graphic service 14 may also be configured to enable a user of device 12 to customize the graphic by, for example, adding text and images. Thus, a graphic, may take the form of a digital image.

Components 12 and 14 are interconnected via link 16. Link 16 represents generally one or more of a cable, wireless, fiber optic, or remote connections via a telecommunication link, an infrared link, a radio frequency link, or any other connectors or systems that provide electronic communication. Link 16 may include, at least in part, an intranet, the Internet, or a combination of both. Link 16 may also include intermediate proxies, routers, switches, load balancers, and the like. The paths followed by link 16 between components 12 and 14 as depicted in FIG. 1A represent the logical communication paths between these devices, not necessarily the physical paths between the devices.

In the example of FIG. 1A, device 12 is shown to include screen 18. Here, device 12 is causing screen 18 to display a captured image of an environment 18. As depicted that environment is a room with a wall 22. In FIG. 1B, three additional captured images of the same wall 22 in the environment 20 are shown at different points in time and from different angles. Graphic 24 is overlaid on wall 22 in each captured image in FIG. 1B providing a preview of graphic 24 in environment 20. The images displayed by device 12 in FIG. 1B, may be frames from a video in which a user is previewing graphic 24 in real-time.

Components:

FIG. 2 depicts examples of physical and logical components for implementing various embodiments. In FIG. 2, device 12 is shown as a system that includes screen 18, camera 26, capture engine 28, surface engine 30, graphic engine 31, display engine 32, zone engine 33, and action engine 34. While shown as being integrated into one device, components 18, and 26-34 may be distributed across two or more devices. For example, camera 26 may be a peripheral coupled to device 12.

Screen 18 represents generally any screen that can be caused to display an image for viewing by a user. Camera 26 represents generally any camera than can be caused to capture an image that can then be displayed on screen 18. Camera 26 may be used to capture both still images and motion video. Capture engine 28 represents generally any combination of hardware and programming configured to cause camera 26 to capture still images and motion video. In other words, capture engine 28 is responsible for placing device 12 in a mode where it captures still images and in a mode in which it captures video—both of which are ultimately caused to be displayed by screen 18. The mode in which capture engine 28 places device 12, as discussed below can be guided by surface engine 30.

Surface engine 30 represents generally any combination of hardware and programming configured to define a surface of an image caused to be captured by capture engine 28. Surface engine 30 may do so automatically or manually. A manual process can involve a user selecting the corners of a surface in the captured image as displayed by screen 18. Where screen 18 is a touch-screen, this can involve the user touching the four corners of the surface such as a wall, floor, table, or other object to be defined. Alternatively another input device could be used to select the corers. Surface engine 30 can then use the coordinates of the corners selected within the image to define the surface. Surface engine 30 may implement an automatic process by detecting lines in a captured image using a Sobel or similar filter. Intersections can then be calculated. The detected lines are screened to identify those that belong to a surface such as a wall based on line length and known wall geometry.

Initially, surface engine 30 guides capture engine 30 to place device in a still image capture mode. Then, at the guidance of a user for example, a still image is captured and caused to be displayed by screen 18, and surface engine 30 defines a surface. With the surface defined, surface engine 30 guides capture engine to place device 12 in a video mode in which camera 26 continually captures a series of sequence of images at a relatively high rate while screen 18 is caused to display the resulting video from those images in real time. Surface engine 30 is responsible for identifying or otherwise locating the defined surface within the series of images captured to generate the video. Surface engine 30 may accomplish this task, for example, by implementing a feature detection algorithm such as Scale Invariant Feature Transform (SIFT).

Graphic engine 31 represents generally any combination of hardware and programming configured to overlay a graphic on the image identified in each of the series of images. In doing so, graphic engine 31 may acquire the graphic from graphic service 14. In each given image of the series, graphic engine 31 identifies a geometry of that image. As device 12 moves within the environment, the vantage point from which an image is captured changes as does the geometry of the surface. Examples of the changing geometry of a surface are discussed below in connection with FIG. 6. Graphic engine 31 modifies the graphic to match the identified geometry of the surface for a given image and then overlays the modified graphic on the surface identified in that image. Graphic engine 31 may also adjust an opacity of the graphic so that features on the identified surface such as doors and windows on a wall bleed though the graphic when the images of the series are displayed as the video.

Display engine 32 represents generally any combination of hardware and programming configured to capable of causing screen 18 to display still images and motion videos captured b camera 16 at the direction of capture engine 28. Where screen 18 is a touch screen, display engine 32 may also be responsible for overlaying controls on the images caused to e displayed. Such controls may be for causing device 12 to capture an image and to direct the adjustment of the opacity of a graphic. Examples of such controls can be seen in FIG. 6.

Zone engine 33 represents generally any combination of hardware and programming configured to detect a user's interaction with a zone in an image being displayed by screen 18. In particular, that interaction may be with a predefined zone of a graphic overlaying the surface identified in the displayed image. A pre-defined zone is a closed area of a graphic. The zone is defined by discernable coordinates within that graphic. A graphic may include an element. A pre-defined zone may be an area of the graphic bounding that element or a portion thereof. Examples of predefined zones are discussed below in connection with FIG. 7 where the elements bounded by the zones are depicted as animals.

Zone engine 33, may detect user interaction by determining that at least a portion of a zone falls within a predetermined position within a captured image. In one example, that position may be the center of the image. When a user positions device 12 such that the zone within a graphic overlay is positioned, for a period of time, in the center of images captured by camera 26, the user can be presumed to be interacting with that zone. As noted above, a graphic is a digital image. The predefined zones of a graphic can be identified by metadata included in that digital image. The metadata, may, for example, be coordinates defining the zones. Zone engine 33 may perform this function by determining that the coordinates of the zone within the graphic lie at the center of the captured image on which the graphic is overlaid. In another example, the metadata may be data identifying an element bounded by a zone. Zone engine 33 may perform its function by examining the captured image and recognizing that the element of the graphic bounded by the zone is positioned at the center of the captured image.

User interaction can take other forms. For example, where screen 18 is a touch screen, user interaction can include touching screen 18. Where the user's touches the zone within the displayed image, the user can be presumed to be interacting with the zone.

Figure 7:
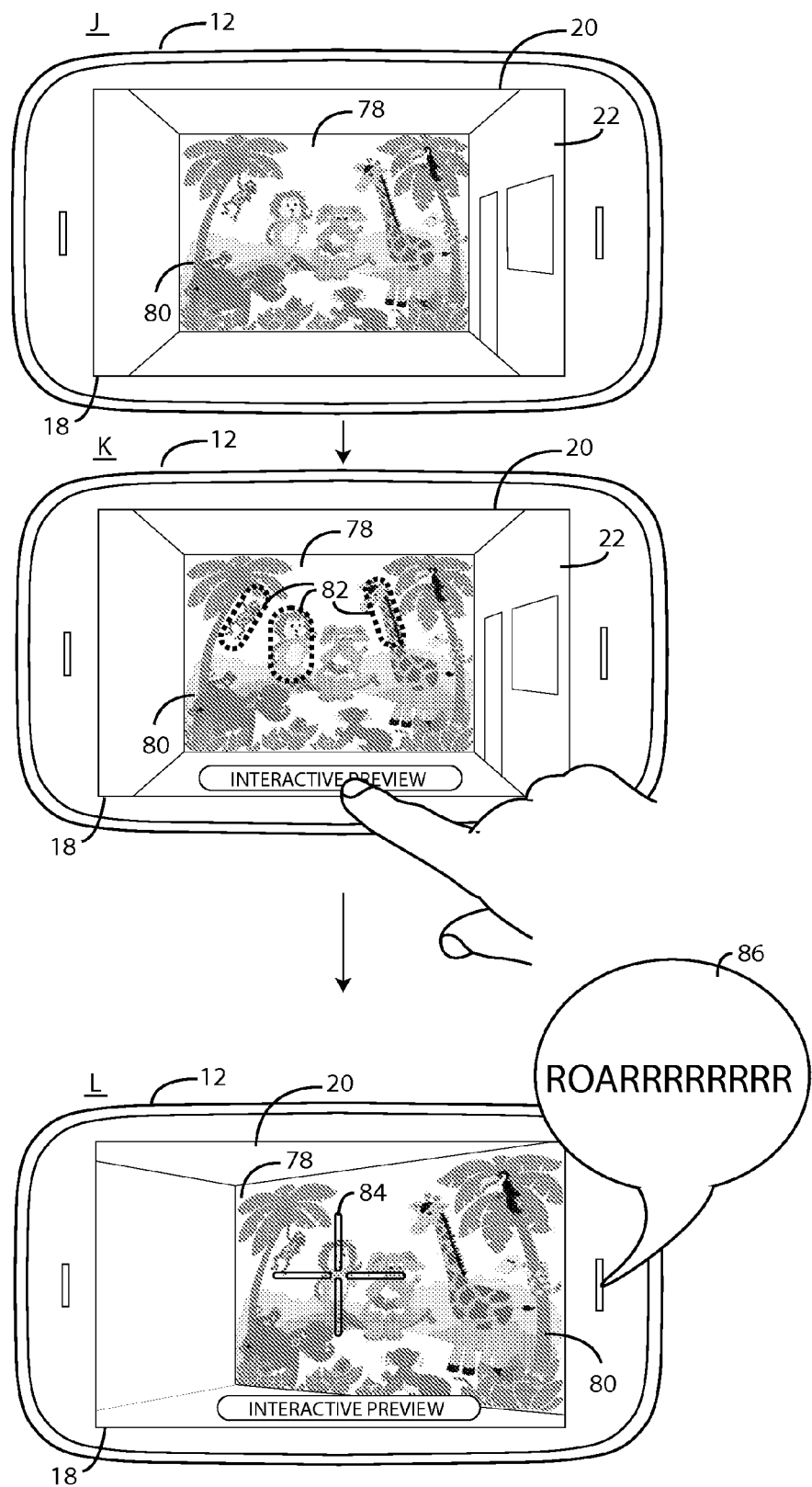
FIG. 7 depicts a sequence of screen views in user interaction with a predefined zone of a graphic overlay within a displayed image results in the triggering of an action associated with that zone according to an embodiment.

Action engine 34 represents generally any combination of hardware and programming configured to trigger an action associated with a predefined zone. Action engine 34 does so once zone engine 33 detects user interaction with the zone. Again, it is noted that the graphic can take the form of a digital image having metadata. The metadata defines a zone within the graphic as well as an action associated with the zone. An associated action can, for example, be any action that can be performed by device 12 in response to being triggered by action engine 34. In the example of FIG. 7, an action associated with a zone that bounds a lion in a graphic can include playing an audio clip of a lion's roar. In another example where device 12 is a smart phone, an action may include dialing a contact, sending a message, or accessing a web page. Further, an action may include executing a specified application or opening a file within an application.

It was noted above that a graphic is a virtual representation of a physical object. Such an object may be wall paper having interactive zones. Device 12 may capture images of a wall on which the wall paper has been installed. Zone engine 33 can detect user interaction with a zone in the portion of a captured image representing the wall paper. In an example, zone engine 33 examines a captured image and identifies a graphic representation of the wall paper. That graphic can be a digital image that includes metadata defining the interactive zones. The metadata may define relative coordinates of a zone within the graphic that map to a relative area of the wallpaper. Zone engine 33 detects interaction with the zone when that area of the wall paper appears within a predetermined location within a captured image. Instead, the metadata may identify an element that is bounded by the zone. Upon detecting that element in the predetermined location of the captured image, zone engine 33 detects or otherwise presumes user interaction with the corresponding zone. Thus, user interaction with a zone of a graphic can be detected both with respect to a captured image that includes the graphic as an overlay and a captured image of the actual wallpaper represented by the graphic.

Graphic service 14, in FIG. 2, is shown to include job engine 36, graphic store 38, job store 40, and application store 42. Job engine 36 represents generally any combination of hardware and programming configured to communicate a graphic to device 12. In doing so, job engine 36 may present device 12 with a selection of graphics from which to choose, obtaining those graphics from graphic store 38. Graphic service 14 may save a user's selections in job store 40. Device 12 may not initially be configured with engines 28-34. In such a case, job engine 42 may communicate an installation package from application store 42 to device 12—the installation package containing a software representation of engines 28-34. Device 12 then executes the installation package to enable the functionality discussed above.

In foregoing discussion, various components were described as combinations of hardware and programming.

Figure 3:
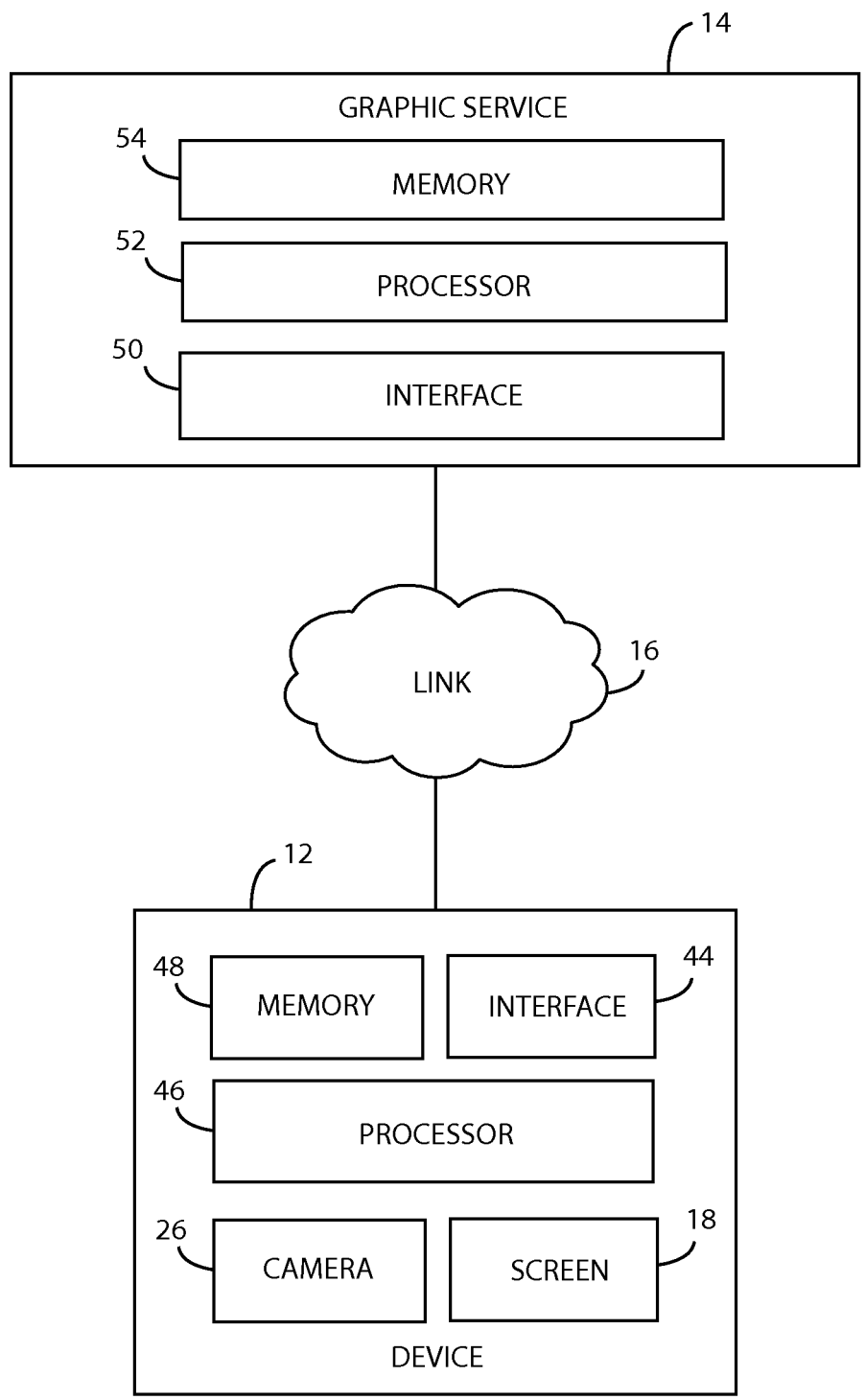

Such components may be implemented in a number of fashions. One example is depicted in FIG. 3 where, in addition to screen 18 and camera 26, device 12 is shown to include interface 44, processor 46 and memory 48. Interface 44 represents hardware that device 12 can use to communicate data to and from graphic service 14 via link 16. Such communications may, for example, employ a wireless protocol.

Processor 46 represents generally any device for executing program instructions stored in memory 48. Memory 48 represents generally any memory configured to store data and program instructions (programming) that, when executed, cause processor 48 to implement the functionality of engines 28-34 of FIG. 2. Thus, the hardware portions of engines 28-34 may be implemented though processor 46. The programming elements may be instructions stored in memory 48.

Graphic service 14, in FIG. 3, is shown to include interface 50, processor 52, and memory 54. Interface 50 represents hardware that graphic service 14 can use to communicate data to and from device 12 via link 16. Processor 52 represents generally any device for executing program instructions stored in memory 54. Memory 54 represents generally any memory configured to store data and program instructions (programming) that, when executed, cause processor 52 to implement the functionality of job engine 36 of FIG. 2. Thus, the hardware portion of job engine 36 may be implemented though processor 52. The programming elements may be instructions stored in memory 54.

Memory 54 may further function as graphic store, 38, job store 40, and application store 42. As previously discussed, application store 42 may maintain an installation package for an application or applications that when installed on device 12 and executed by processor 46 enables device 12 to function as a system that includes engines 28-34 of FIG. 2.

Figure 4:
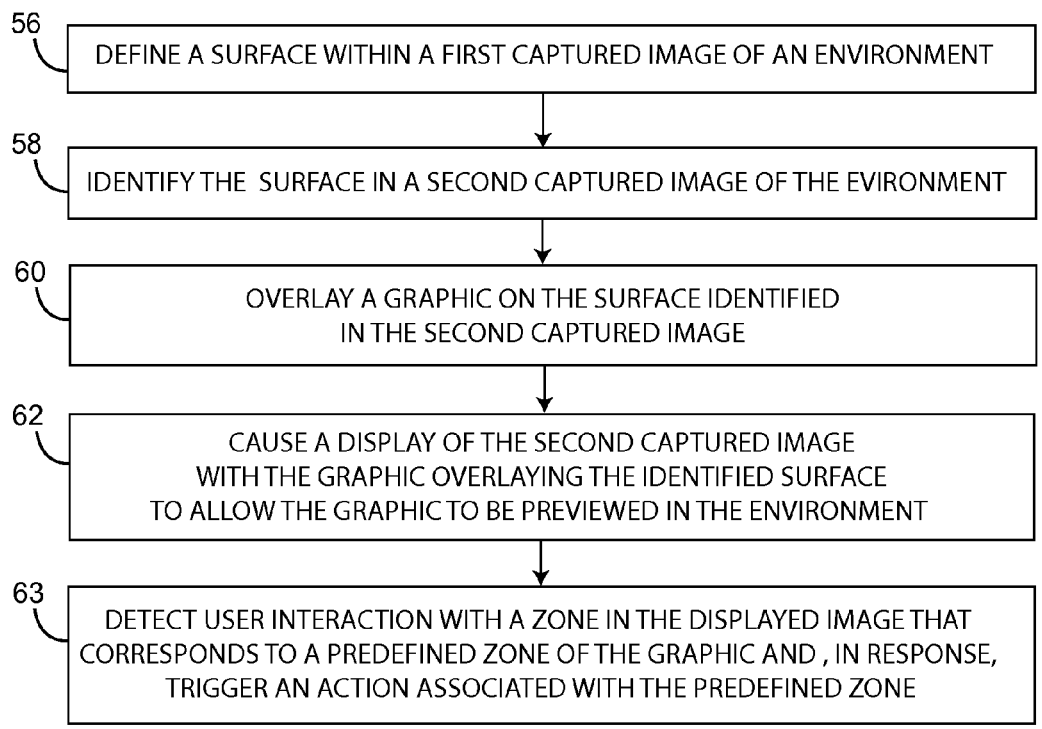
FIGS. 4-5 are exemplary flow diagrams depicting steps taken to implement various embodiments.
Figure 5:
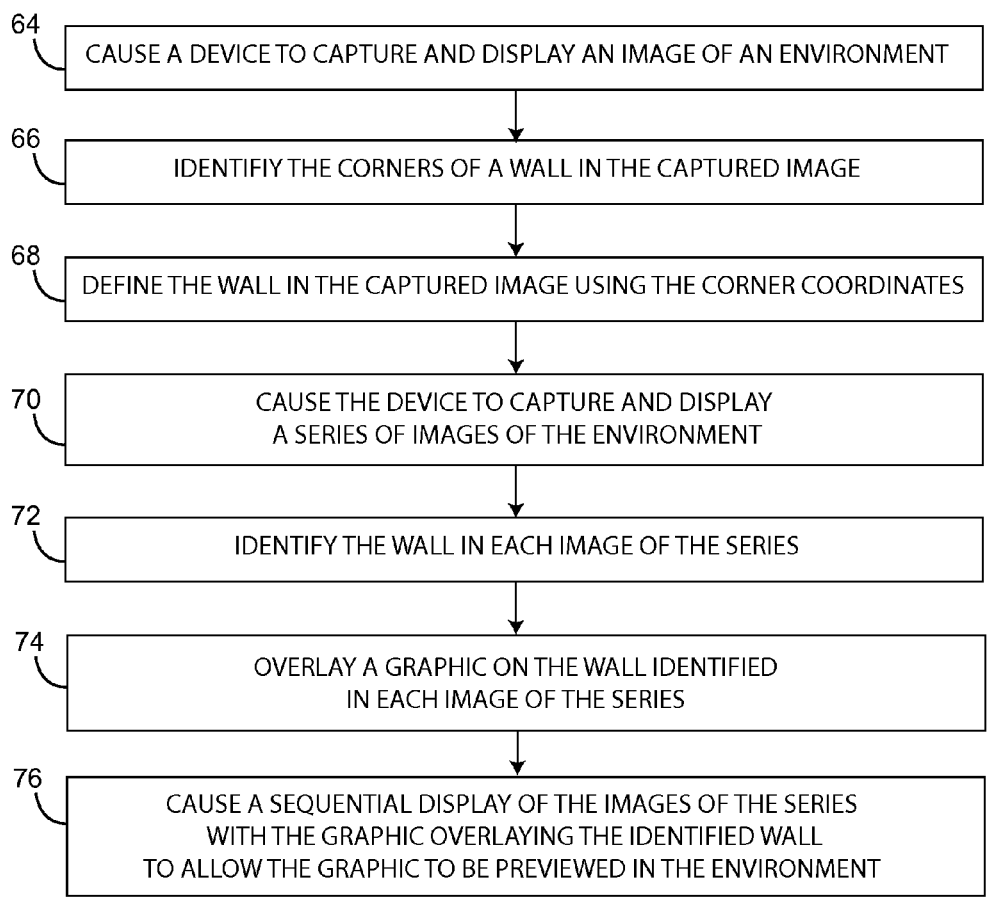

Operation:

FIGS. 4-5 are exemplary flow diagrams of steps taken to implement various embodiments in which a graphic is overlaid on a surface. In discussing FIGS. 4-5, reference may be made to the elements of FIGS. 1-3 to provide contextual examples. Implementation, however, is not limited to those examples. Additional reference will also be made to FIGS. 6-7 which depict, as examples, sequences of screen views (A-G) in which a user selects a graphic and previews that graphic overlaying a wall and (K-L) in which a user is interacting with displayed image to trigger an action.

Starting with FIG. 4, a surface is defined within a first captured image of an environment (step 56). As noted above, the wall may be defined automatically or manually. In a manual approach, the coordinates within the image may be identified and used to define the surface. Looking at screen view C in FIG. 6, a user is manually selecting the corners of a wall, the coordinates of which can be used to define the wall. With surface defined in step 56, that surface is identified in a second captured image of the same environment (step 58). That second image may be one of a series of images defining a video. In which case, step 58 can involve identifying the surface in each image of that series. Referring to FIG. 2, surface engine 30 may be responsible for implementing steps 56 and 58.

Figure 6:
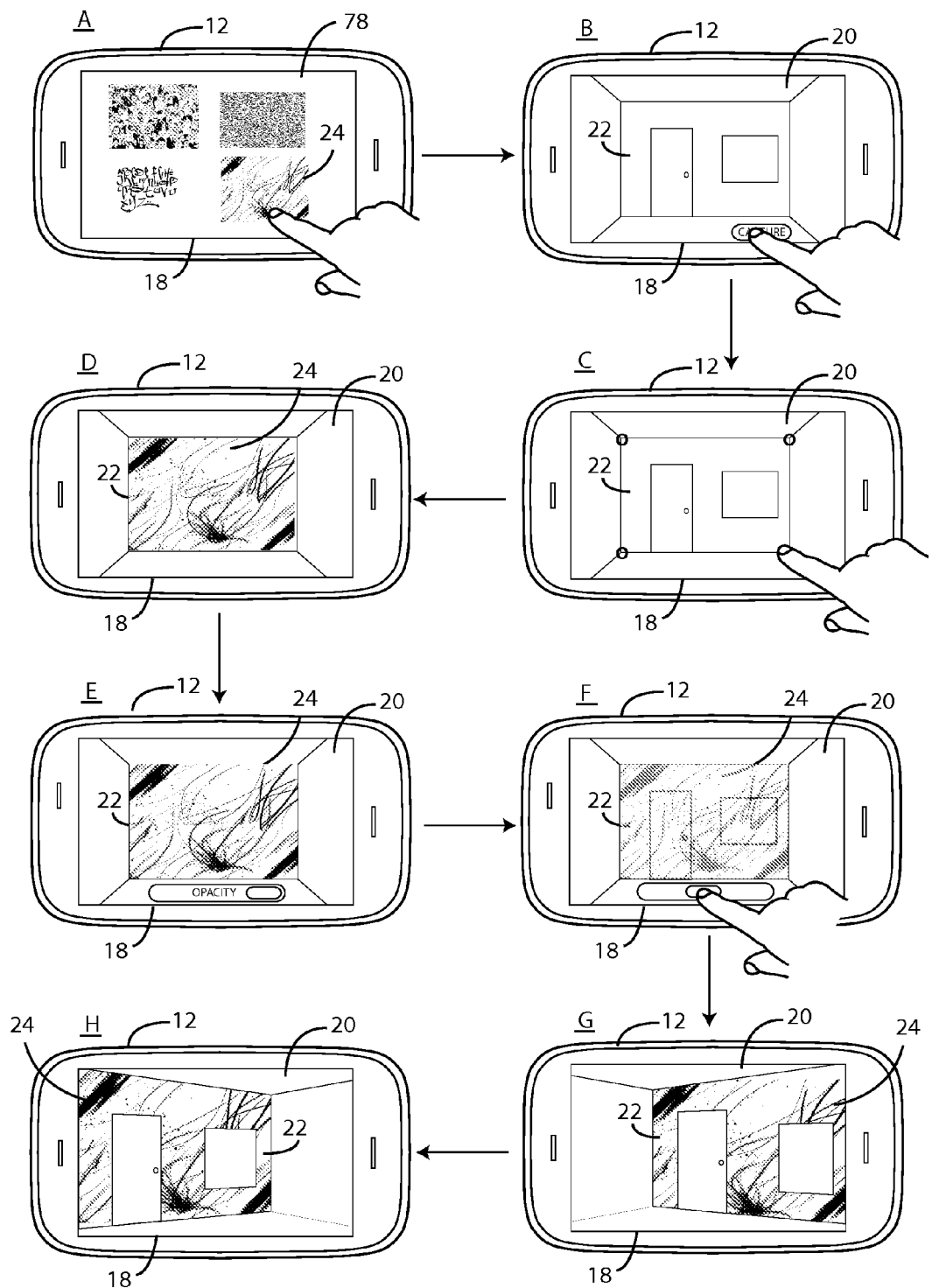
FIG. 6 depicts a sequence of screen views in which a user selects a graphic and previews that graphic overlaying a wall according to an embodiment.

A graphic is overlaid on the surface identified in the second captured image (step 60). Screen view D of FIG. 6 provides an example. As noted above, the second captured image may be one of a series of images defining a video. In this case, step 60 can include overlaying the graphic in each image of the series. Step 60 can involve identifying geometry of the identified surface and then modifying the graphic to match that geometry. Screen views H and G of FIG. 6 provide examples. Step 60 can also involve adjusting opacity of the graphic and overlaying the graphic such that at least a portion of the identified wall bleeds through the graphic and is visible when the second captured image is displayed. Referring to FIG. 2, graphic engine 31 may be responsible for implementing step 60.

The second captured image with the graphic overlaying the identified surface is caused to be displayed (step 62). This allows the graphic to be previewed in the environment. Screen views F, G, and H of FIG. 6 provide examples. Again, the second captured image may be one of a series of images defining a video. Thus step 62 can involve causing a display of the series of images where each image includes the graphic overlaying the surface identified in that image. In this fashion, the graphic can be previewed in real time or near real time. Referring to FIG. 2, display engine 34 may be responsible for implementing step 62.

The graphic may include a predefined zone associated with an action. User interaction with a zone in the displayed second captured image is detected (step 63). That zone corresponds to the predefined zone in the graphic. In response to the detection, the associated action is triggered. Referring back to FIG. 2, zone engine 33 and action engine 34 may be responsible for implementing step 63. Looking at FIG. 7, a series of screen views (J-L) are depicted in which an action is triggered in response to detecting user interaction with a zone. In screen view J, the captured image being displayed by device 12 includes wall 78 of environment 20. A graphic 80 has been overlaid on wall 78 in the captured image. Alternatively, wallpaper represented by the graphic 80 has been installed on wall 78. Graphic 80 includes pre-defined zones 82 shown in broken lined in screen view K. A user has selected an interactive preview mode causing cross-hairs 84 to appear in screen view L. The user has positioned device 12 so that crosshairs 84 are centered on a zone in the captured image that corresponds to a predefined zone 82 of the graphic. This user interaction results in an action being triggered—that action being the playing of an audio clip of a lion's roar.

Moving to FIG. 5, a device is caused to capture and display an image of en environment (step 64). Capture engine 28 of FIG. 2 may implement step 64. Referring to FIG. 6, screen view B depicts a user interacting with device 12. The interaction results in capture engine 28 causing device 12 to capture an image of environment 20. The corners of a wall are identified in the captured image (step 66). Referring to screen view C of FIG. 6, a user is interacting with device 12. Based on the interactions, surface engine 30 identifies the coordinates of the corners of wall 22. The wall is defined in the captured image using the coordinates of the corners identified in step 66 (step 68). Surface engine 30 of FIG. 2 uses the coordinates of the identified corners to define the wall.

The device is then caused to capture a series of images of the environment (step 70). The series of images define a video that can be displayed in real time or near real time by the device. Once surface engine 30 is able to define the wall, capture engine 28 of FIG. 2 may automatically place device in a video mode in which it captures the series of images. The wall defined in step 68 is identified in each image of the series captured in step 70 (step 72). A graphic is overlaid on the wall identified in each image of the series (step 74). The particular graphic may be one selected by a user of device. Screen view A of FIG. 6 provides an example of a user interacting with device 12 to select graphic 24.

The device is caused to sequentially display the series of images each including the graphic overlay to allow the graphic to be previewed in the environment (step 76). Screen views F, G, and H of FIG. 6 depict three different screen views of a series being displayed. Where the display of each image of the series occurs substantially simultaneously with the capture of that image, the graphic can be previewed in real time or near real time. Referring to FIG. 6, one can see that the camera has moved between the capture of each image causing geometry of wall 22 to differ. The graphic 24 has been adjusted to match the geometry of wall 22 in each image. One can also see that the opacity of graphic 24 has been adjusted between screen views E and F to allow features of wall 22 to bleed though.

CONCLUSION

FIGS. 1-3 aid in depicting the architecture, functionality, and operation of various embodiments. In particular, FIGS. 2-3 depict various physical and logical components. Various components illustrated in FIGS. 2 and 3 are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 4-5 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A non-transitory computer readable medium storing computer executable instructions that when executed cause a system including a processor to:
define a wall within a first captured image of an environment using a feature detection model, wherein the feature detection model detects lines in the first captured image and calculates intersections between the detected lines to define the wall in the first captured image, the first captured image captured by an image capture device at a first time;
identify the defined wall in a second captured image of the environment, the second captured image captured by the image capture device at a second time different from the first time;
overlay a graphic on the identified wall in the second captured image, wherein the graphic includes a predefined zone associated with an action;
cause a display of the second captured image with the graphic overlaying the identified wall to allow the graphic to be previewed in the environment; and
trigger the action in response to detecting user interaction with a corresponding zone in the displayed second captured image that corresponds to the predefined zone.

2. The medium of claim 1, wherein detecting the user interaction comprises determining that at least a portion of the corresponding zone falls within a predetermined position within the second captured image.

3. The medium of claim 1, wherein the overlaying includes:
identifying a geometry of the identified wall in the second captured image;
modifying the graphic to match the geometry; and
overlaying the modified graphic on the identified wall in the second captured image.

4. The medium of claim 1, wherein the second captured image is one of a series of captured images of a video of the environment captured by the image capture device, wherein the instructions when executed cause the system to, following capture of each respective image of the series:
identify the defined wall in the respective image and overlay the graphic on the wall identified in the respective image; and
cause a display of the respective image that includes the graphic overlaying the wall identified in the respective image.

5. The medium of claim 4, wherein the instructions when executed cause the system to adjust an opacity of the graphic and wherein overlaying the graphic on the wall identified in the respective image comprises overlaying the graphic such that at least a portion of the wall identified in the respective image bleeds through the graphic and is visible when the respective image is displayed.

6. The medium of claim 4, wherein overlaying the graphic on the wall identified in the respective image comprises identifying a geometry of the wall identified in the respective image, modifying the graphic to match the geometry, and overlaying the modified graphic on the wall identified in the respective image.

7. The medium of claim 4, wherein the captured images in the series have different views of the environment, and wherein overlaying the graphic in each of the captured images in the series allows for previews of the graphic in the different views of the environment.

8. The medium of claim 1, wherein the instructions are for execution by the image capture device that comprises the system.

9. The medium of claim 1, wherein the first captured image is captured by the image capture device set in a still image capture mode, and the second captured image is captured by the image capture device set in a video mode.

10. A system, comprising:
a surface engine to:
define, using a feature detection process, a surface within a first captured image of an environment captured by an image capture device at a first time, wherein the feature detection process detects lines in the first captured image and calculates intersections between the detected lines to define the surface in the first captured image, and identify the defined surface in a second captured image of the environment captured by the image capture device at a second time different from the first time;

a graphic engine to overlay a graphic on the identified surface in the second captured image, wherein the graphic includes a predefined zone associated with an action; and a display engine to cause a display of the second captured image with the graphic overlaying the identified surface to allow the graphic to be previewed in the environment;

a zone engine to detect user interaction with a zone in the displayed second captured image that corresponds to the predefined zone; and an action engine to trigger the action associated with the predefined zone following the zone engine detecting the user interaction.

11. The system of claim 10, wherein the zone engine is to detect the user interaction by determining that at least a portion of the zone falls within a predetermined position within the second captured image.

12. The system of claim 10, wherein the graphic engine is to adjust an opacity of the graphic and overlay the graphic on the identified surface in the second captured image such that at least a portion of the identified surface bleeds through the graphic and is visible when the second captured image is displayed.

13. The system of claim 10, wherein the second captured image is one of a series of captured images of a video captured by the image capture device, wherein, following capture of each respective image of the series:

the surface engine is to identify the defined surface in the respective image;

the graphic engine is to overlay the graphic on the surface identified in the respective image; and the display engine is to cause a display of the respective image that includes the graphic overlaying the surface identified in the respective image.

14. The system of claim 13, wherein the graphic engine is, for each respective image of the series, to identify a geometry of the surface identified in the respective image, modify the graphic to match the geometry, and overlay the modified graphic on the surface identified in the respective image.

15. The system of claim 13, wherein the captured images in the series have different views of the environment, and wherein overlaying the graphic in each of the captured images in the series allows for previews of the graphic in the different views of the environment.

16. The system of claim 10, wherein the first captured image is captured by the image capture device set in a still image capture mode, and the second captured image is captured by the image capture device set in a video mode.

17. A method comprising:

receiving a first image of an environment captured by an image capture device at a first time;

defining, by a system including a processor, a surface within the first image of the environment;

receiving a second image of the environment captured by the image capture device at a second time different from the first time;

identifying the defined surface in the second image of the environment;

overlaying, by the system, a graphic on the identified surface in the second image, wherein the graphic includes a predefined zone associated with an action; and causing, by the system, display of the second image with the graphic overlaying the identified surface to allow the graphic to be previewed in the environment;

detecting user interaction with a zone in the displayed second image that corresponds to the predefined zone; and triggering the action associated with the predefined zone in response to detecting the user interaction.

18. The method of claim 17 wherein the first image is a still image captured by the image capture device in a still image capture mode, and the second image is one of a series of images of a video captured by the image capture device in a video mode.

19. The method of claim 18, further comprising:

for each respective image in the series of images, identifying the defined surface in the respective image, and overlaying the graphic on the surface identified in the respective image; and causing sequential display of the series of images each with the graphic overlaying the surface identified within that image.

20. The method of claim 19, wherein the images in the series have different views of the environment, and wherein overlaying the graphic in each of the images in the series allows for previews of the graphic in the different views of the environment.

21. The method of claim 17, wherein the first captured image is captured by the image capture device set in a still image capture mode, and the second captured image is captured by the image capture device set in a video mode.

* * * * *

UNITED STATES PATENT AND TRADEMARK OFFICE
CERTIFICATE OF CORRECTION

PATENT NO. : 9,013,507 B2  Page 1 of 1
APPLICATION NO. : 13/040599
DATED : April 21, 2015
INVENTOR(S) : Jean-Frederic Plante et al.

It is certified that error appears in the above-identified patent and that said Letters Patent is hereby corrected as shown below:

Claims

In column 9, line 10, in Claim 10, delete "action; and" and insert -- action; --, therefor.

In column 10, line 18, in Claim 17, delete "action; and" and insert -- action; --, therefor.

Signed and Sealed this
Twelfth Day of April, 2016

Michelle K. Lee
*Director of the United States Patent and Trademark Office*